US005683258A

United States Patent [19]

Takano et al.

[11] Patent Number: 5,683,258

[45] Date of Patent: Nov. 4, 1997

[54] PC CARD CONNECTOR

[75] Inventors: Yasunari Takano; Hidehiro Nakamura; Tetsuya Furusawa, all of Miyagi-ken, Japan

[73] Assignee: Alps Electric Co., Ltd., Tokyo, Japan

[21] Appl. No.: 694,885

[22] Filed: Aug. 9, 1996

[30] Foreign Application Priority Data

Sep. 6, 1995 [JP] Japan .................................... 7-229324

[51] Int. Cl.⁶ .................................................... H01R 13/62

[52] U.S. Cl. ............................................................ 439/159

[58] Field of Search .................................... 439/159, 160, 439/152, 153, 154, 155, 156, 157, 372

[56] References Cited

U.S. PATENT DOCUMENTS

| | | | |
|---|---|---|---|
| 4,128,288 | 12/1978 | Zachry et al. | 439/152 |
| 5,145,389 | 9/1992 | Okubo | 439/159 |
| 5,275,573 | 1/1994 | McCleerey | 439/159 |
| 5,281,157 | 1/1994 | Abe et al. | 439/159 |
| 5,368,493 | 11/1994 | O'Brien et al. | 439/160 |
| 5,466,166 | 11/1995 | Law et al. | 439/159 |
| 5,499,925 | 3/1996 | Lwec | 439/157 |

*Primary Examiner*—Gary F. Paumen
*Assistant Examiner*—Tho Dac Ta
*Attorney, Agent, or Firm*—Guy W. Shoup; Patrick T. Bever

[57] ABSTRACT

A PC card connector has an injection mechanism which is improved so as to make it possible to push a PC card in a substantially straightforward direction, in which the PC card is withdrawn, without converting rotary motion into linear motion. The PC card connector is further improved so as to be able to assure the constant smooth withdrawal of the PC card without the need of a complicated or large-sized structure. The PC card connector is provided with a push rod which is pressed to remove the PC card, an eject lever which is supported by a first fulcrum in a pivotal manner, and which has one end engaged with the push rod and has a first claw at the other end to eject the PC card, and a rotary arm which is supported by a second fulcrum in a pivotal manner and has at one end a second claw to eject the PC card, and which has the other end connected to a predetermined location in the eject lever. In this PC card connector, the predetermined location is defined on the opposite side to the first claw with respect to the first fulcrum.

14 Claims, 9 Drawing Sheets

4a 4 7 4b 2b 3b 6 1a 3 3a 3e 4e 2c 2 5 2a A 2c 1

3
3d
3c
3b 4
4b
4d
4c

PC CARD CONNECTOR

BACKGROUND OF THE INVENTION

The present invention relates to a PC card connector disposed in an apparatus which operates while retaining an inserted PC card, more particularly, to an improved ejection mechanism for ejecting a PC card inserted into a connector from pin contacts.

PC cards (memory cards) used with a notebook-type personal computer, or the like, are inserted into, or removed from, a connector specifically designed for the PC card. As some progress is recently made toward commonality (or standardization) of the shape of the PC cards, and the size, layout, or the like, of the pin contacts of the PC card connectors, a plunge in demands on PC cards and PC connectors is expected because of a leap in the versatility of the same products.

Usually, a PC card connector principally comprises a pin header with a pin housing which houses a plurality of pin contacts to be connected to socket contacts provided in the PC card, a frame for guiding the PC card when it is inserted and removed, and an ejection mechanism for ejecting the PC card in an inserted condition from the pin contacts, or the like. A PC card having a pin housing and a frame which are formed into a single unit is also known. The ejection mechanism is made up of a push rod to be pressed down when the PC card is withdrawn, a lever which is pivotally supported and has one end engaged with the push rod, or the like. The conventional ejection mechanism has the principal construction which will be described below.

A push rod is disposed along the side of the frame which guides the PC card, so as to move back and forth in the direction in which the PC card is inserted and withdrawn. An eject lever having at one end a claw to force out the PC card is attached to a predetermined location of the frame or a pin housing in a pivotal manner. The other end of the eject lever is engaged with the rear end of the push rod, whereby the ejection mechanism is constructed. If the push rod is pressed while the PC card is inserted in the PC card connector, the eject lever pivots, so that the claw of the eject lever moves forward. One end of the socket-contact-side end face (hereinafter referred to as a pin withdrawing surface) of the PC card is forced into the claw, as a result of which the PC card is removed from the pin contacts. In the end, the PC card can be easily withdrawn from the connector by the fingers. When the PC card is inserted into the connector so as to connect with the pin contacts, the PC card pushes the claw, so that the eject lever pivots in the direction opposite to the direction in which it pivots when the eject lever is withdrawn.

Another known example of the traditional ejection mechanism is made up of an actuating lever which has one end engaged with the rear end of the push rod and is attached to a predetermined location of the frame or pin housing in a pivotal manner. The other end of the actuating lever is jointed to a slider which has claws at both ends and is movable back and forth in the direction in which the PC card is inserted and withdrawn. In short, the ejection mechanism of this type converts the rotary motion of the actuating lever into linear motion of the slider. If the push rod is pressed while the PC card is inserted in the PC card connector, the two claws of the slider push both ends of the pin withdrawing surface of the PC card in the direction the PC card is ejected.

The first described ejection mechanism is designed such that the claw provided on the other end of the eject lever having one end engaged with the push rod pushes one end of the pin withdrawing surface of the PC card. It is impossible for the claw to push the PC card in a straightforward direction, in other words, the PC card is forced out while being pressed against the frame beside the push rod. This type of ejection mechanism obstructs smooth removal action, and the PC card is apt to be damaged.

On the other hand, the second described ejection mechanism is designed such that the two claws provided on the slider, which moves in conjunction with the push rod via the actuating lever, push both ends of the pin withdrawing surface of the PC card. By virtue of a resultant force generated by these two claws, the PC card can be pushed so as to be removed in a substantially straightforward direction. Thus, the ejection mechanism of this type has such an advantage as to be able to provide smooth removal action. However, it is necessary to provide the ejection mechanism with a highly accurate guide mechanism capable of assuring a predetermined clearance in order to linearly move the slider in the direction in which the PC card is withdrawn and inserted. Further, the slider must have high dimensional accuracy and a long slide portion. As described above, the second type of ejection mechanism has the disadvantage of requiring a complicated mechanism, which in turn hinders a reduction in size of the PC card connector.

SUMMARY OF THE INVENTION

The present invention has been conceived in view of the foregoing drawbacks in the related art, and the primary object of the present invention is to provide a PC card connector capable of assuring the constant smooth withdrawal of a PC card without the need of a complicated or large-sized structure.

According to a first aspect of the present invention, there is provided a PC card connector comprising a push rod which is pressed to remove the PC card; an eject lever which is supported by a first fulcrum in a pivotal manner, and which has one end engaged with the push rod and has a first claw at the other end to eject the PC card; and a rotary arm which is supported by a second fulcrum in a pivotal manner and has at one end a second claw to eject the PC card, and which has the other end connected to a predetermined location in the eject lever, wherein the predetermined location is defined on the opposite side to the first claw with respect to the first fulcrum.

According to a second aspect of the present invention, there is provided a PC card connector comprising a push rod which is pressed to remove a PC card; an actuating lever which is supported by a first fulcrum in a pivotal manner and has one end engaged with the push rod; a first rotary arm which is supported by the first fulcrum in a pivotal manner and has at one end a first claw to eject the PC card, and which has the other end connected to a predetermined location in the actuating lever; and a second rotary arm which is supported by a second fulcrum in a pivotal manner and has at one end a second claw to eject the PC card, and which has the other end joined to the predetermined location of the actuating lever, wherein the predetermined location is defined so as to become close to the push rod in relation to the first fulcrum.

According to the PC card connector as defined in the first aspect of the present invention, if the push rod is pushed while the PC card is inserted in the PC card connector, the eject lever pivots, so that the first claw moves forward. Associated with the forward movement of the first claw, the rotary arm jointed to the eject lever pivots, so that the second claw also moves forward. The forward movements of these two claws make it possible to push the PC card in a substantially straightforward direction in which the PC card is withdrawn. The PC card connector of this type only requires the pivotal movement of the rotary arm utilizing the pivotal movement of the eject lever, which eliminates the need of the highly accurate guide mechanism required in the conventional art and contributes to a more compact PC connector.

According to the PC card connector as defined in the second aspect of the present invention, if the push rod is pushed while the PC card is inserted in the PC card connector, the first and second rotary arms jointed to the actuating lever pivot in conjunction with the pivotal movement of the actuating lever. As a result, the first and second claws move forward, which makes it possible to push the PC card in a substantially straightforward direction in which the PC card is withdrawn. As with the previously described PC card connector as defined in the first aspect, this PC card connector only requires the pivotal movement of the first and second rotary arms utilizing the pivotal movement of the actuating lever, which eliminates the need of the highly accurate guide mechanism and contributes to a more compact PC connector.

DETAILED DESCRIPTION OF THE PREFERRED EMBODIMENTS

With reference to the accompanying drawings, the embodiments of the present invention will be described hereinbelow.

FIGS. 1 through 9 illustrate a PC card connector according to a first embodiment of the present invention.

Figure 1:
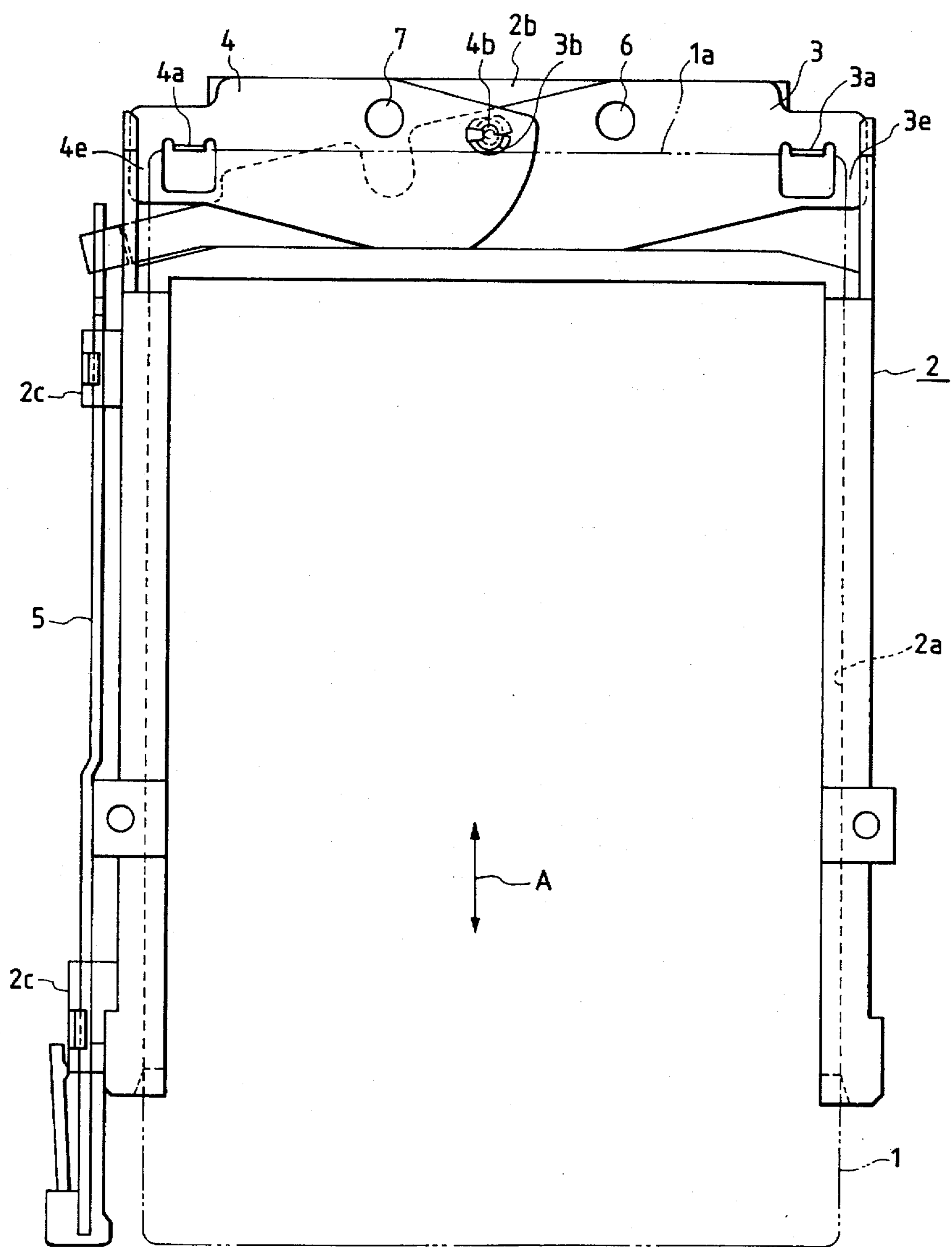
FIG. 1 is a bottom view showing a PC card connector according to a first embodiment of the present invention when a PC card is inserted in the PC card connector.
Figure 2:
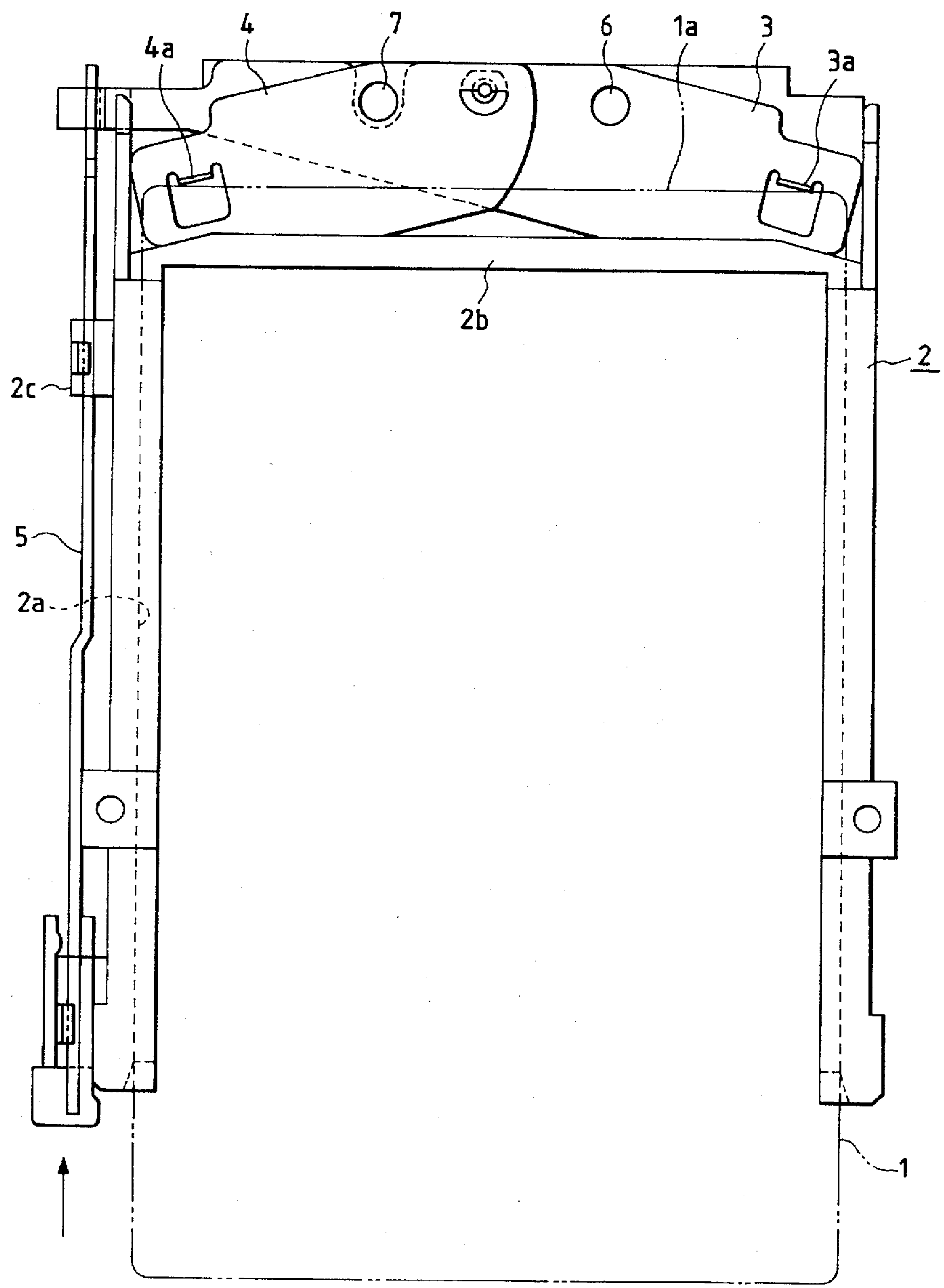
FIG. 2 is a bottom view showing the PC card connector, shown in FIG. 1, which is in an ejecting condition immediately after the withdrawal of the PC card.
Figure 3:
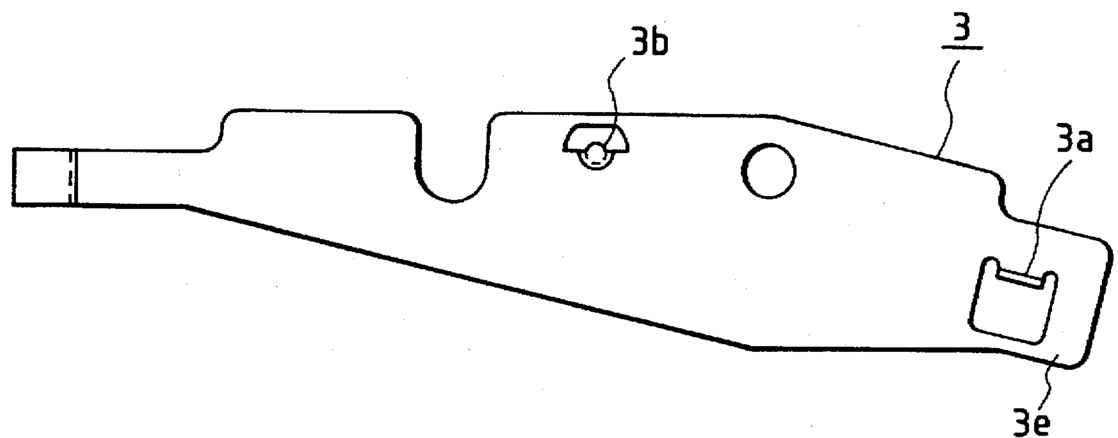
FIG. 3 is a bottom view of an eject lever used in the first embodiment.
Figure 4:
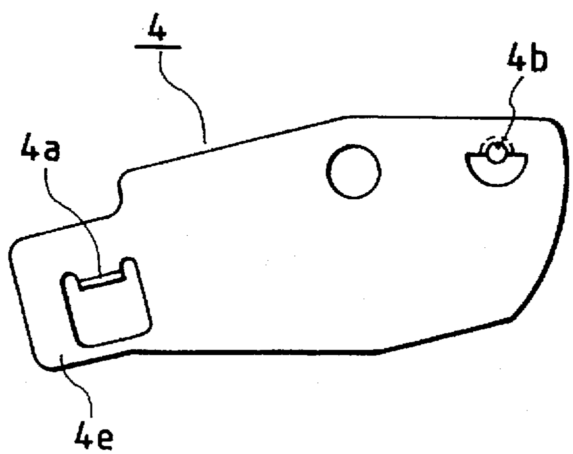
FIG. 4 is a bottom view of a rotary arm used in the first embodiment.
Figure 5:
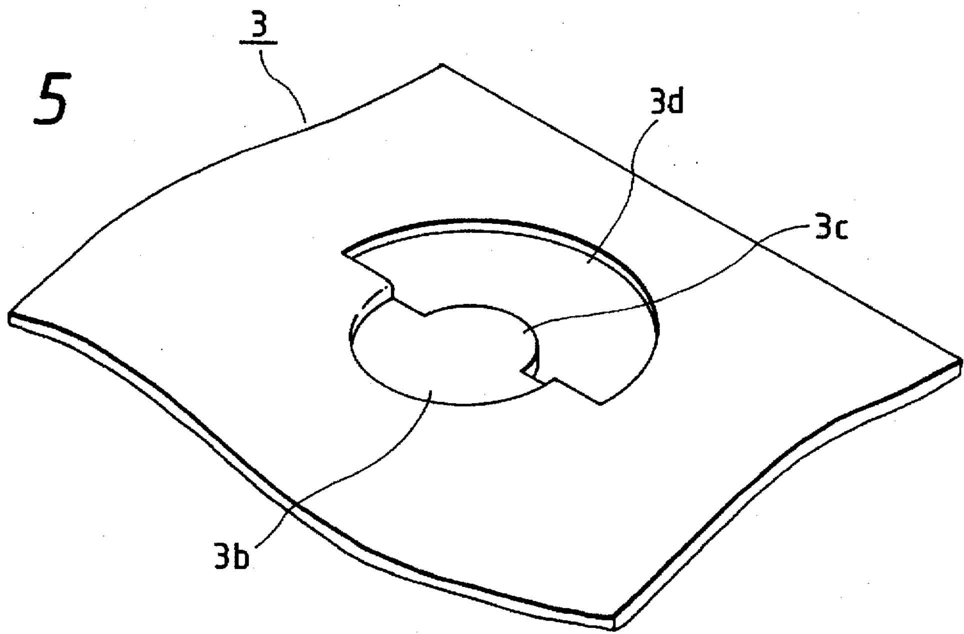
FIG. 5 is an enlarged view of the principal portion of the eject lever shown in FIG. 3 which shows the joint of the eject lever connected to the rotary arm.
Figure 6:
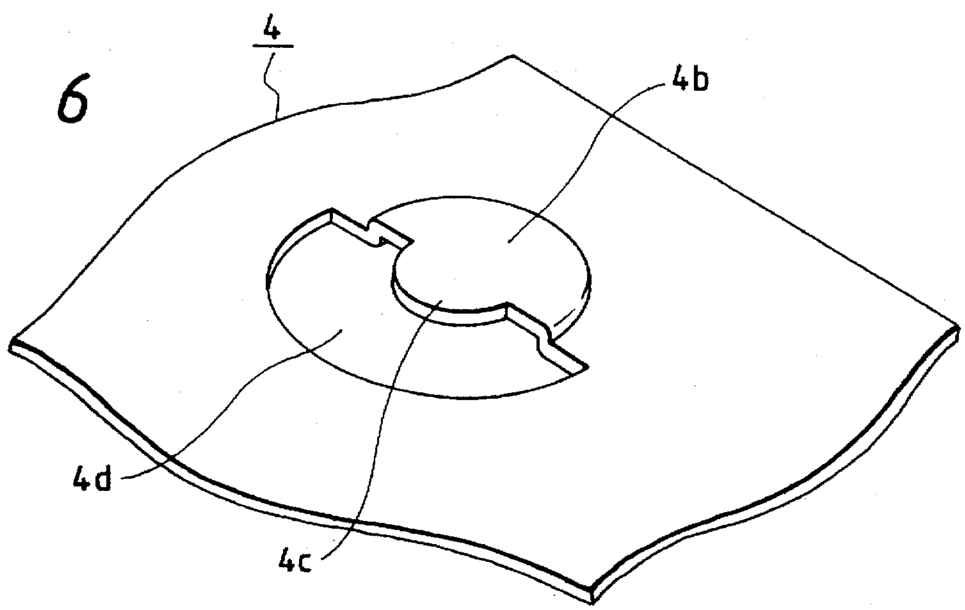
FIG. 6 is an enlarged view of the principal portion of the rotary arm shown in FIG. 4 which shows the joint of the rotary arm connected to the eject lever.
Figure 7:
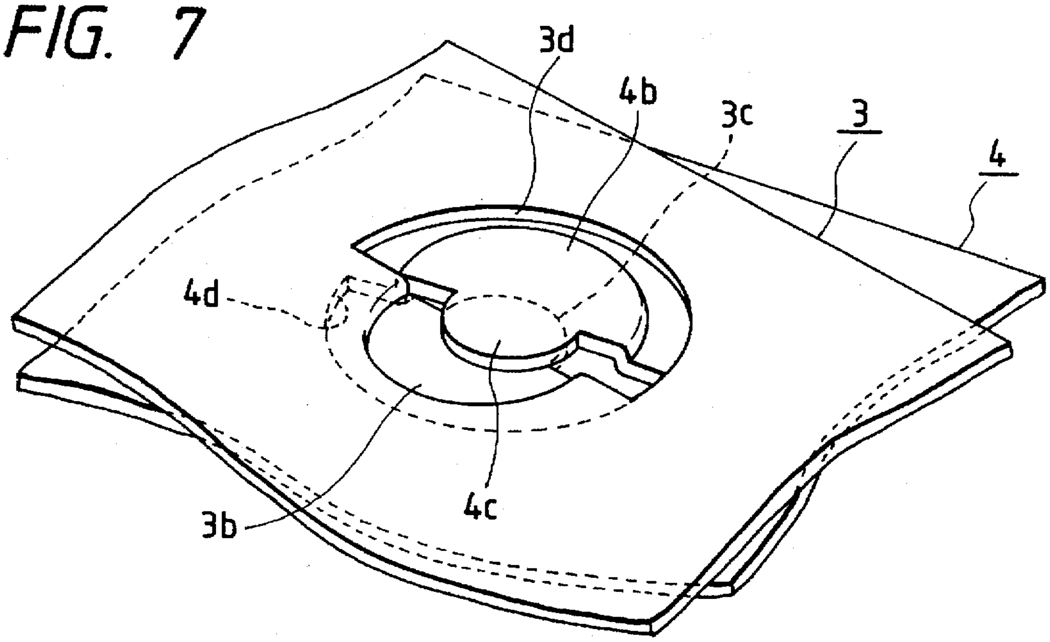
FIG. 7 is a perspective view of the principal elements of the rotary arm and the eject lever which shows the joint structure formed by connection of the joints shown in FIGS. 5 and 6.
Figure 8:
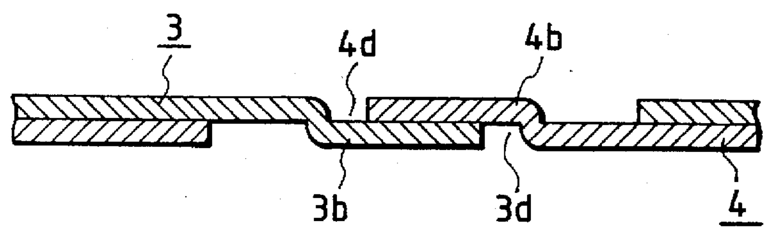
FIG. 8 is a side cross-sectional view showing the shape of cross section of the joint structure shown in FIG. 7.
Figure 9:
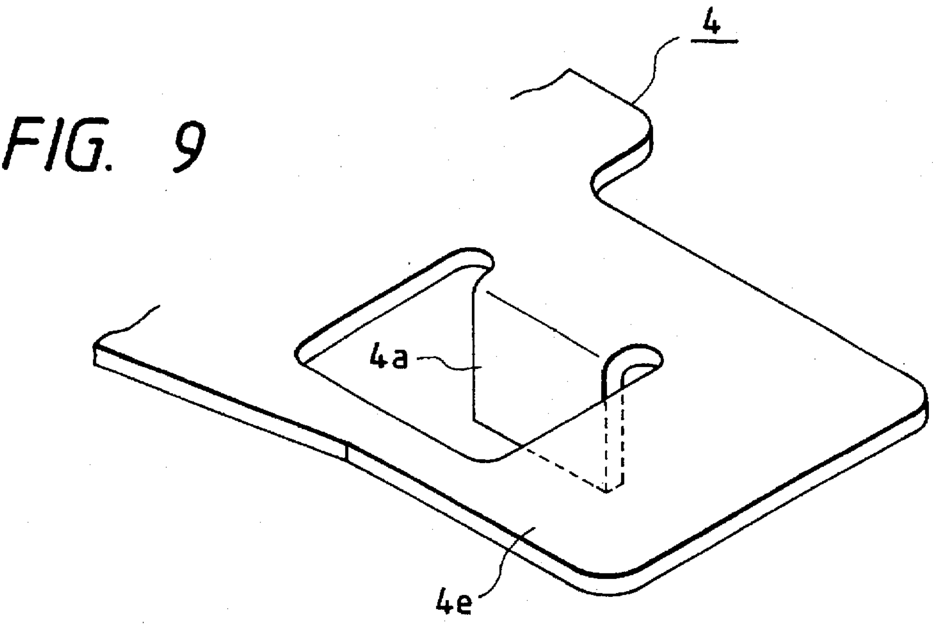
FIG. 9 is a perspective view of the principal element of the rotary arm, shown in FIG. 4, which illustrates one end of the rotary arm in which a claw is formed.

FIG. 1 is a bottom view showing a PC card connector according to a first embodiment of the present invention when a PC card is inserted in the PC card connector; FIG. 2 is a bottom view showing the PC card connector, shown in FIG. 1, which is in an ejecting condition immediately after the withdrawal of the PC card; FIG. 3 is a bottom view of an eject lever used in the present embodiment; FIG. 4 is a bottom view of a rotary arm used in the first embodiment; FIG. 5 is an enlarged view of the principal portion of the eject lever shown in FIG. 3 which shows the joint of the eject lever connected to the rotary arm; FIG. 6 is an enlarged view of the principal portion of the rotary arm shown in FIG. 4 which shows the joint of the rotary arm connected to the eject lever; FIG. 7 is a perspective view of the principal elements of the rotary arm and the eject lever which shows the joint structure formed by connection of the joints shown in FIGS. 5 and 6; FIG. 8 is a side cross-sectional view showing the shape of cross section of the joint structure shown in FIG. 7; and FIG. 9 is a perspective view of the principal element of the rotary arm, shown in FIG. 4, which illustrates one end of the rotary arm in which a claw is formed.

The PC card connector shown in these drawings principally comprises a pin header (not shown) having a pin housing in which a plurality of pin contacts to be connected to socket contacts in a PC card 1 are press-fitted in a predetermined pattern, a frame 2 which has a turned square U-shape shape as viewed from above and has a pair of recessed grooves **2*a* for guiding the PC card 1 from both sides thereof when it is inserted or withdrawn, an eject lever 3 attached to the frame 2, a rotary arm 4, and a push rod 5. A bridge portion 2*b* of the frame 2** is opposite to the upper surface of the pin housing of the pin header.

The structure of the ejection mechanism of the connector will now be described in detail. The eject lever 3 and the rotary arm 4 are supported by a first fulcrum 6 and a second fulcrum 7 attached to the bridge portion **2*b* of the frame 2 in a pivotal manner, respectively. A push rod 5 which is inserted to remove the PC card 1 is retained by two support frames 2*c* projecting from two locations of the side of the frame 2 so as to be movable back and forth in the direction in which the PC card is inserted and removed (in the direction designated by arrow A). An eject lever 3 has at one end a claw 3*a* to eject the PC card 1, and the other end of the eject lever 3 is engaged with the rear end of the push rod 5. Similarly, a rotary arm 4 has a claw 4*a* at the end close to the push rod 5 for ejecting the PC card 2. The other end of the rotary arm 4 is connected to the eject lever 3**.

The joint of the eject lever 3 at which it is connected to the rotary arm 4 is defined on the opposite side to the claw **3*a* with respect to the first fulcrum 6 which is the pivotal axis, as shown in FIGS. 1 and 2. The joint of the eject lever 3 is made up of a recessed engaging step 3*b*, a semicircular notch 3*d* adjoining the recessed engaging step 3*b*, and a semi-circular leaf 3*c* projecting from the engaging step 3*b*** into the semicircular notch 3*d*, as shown in FIGS. 3 and 5. Similarly, the joint of the rotary arm 4 at which it is connected to the eject lever 3 is formed on the opposite side to the claw 4*a*, and that joint is made up of a raised engaging step 4*b*, a semicircular notch 4*d* adjoining the raised engaging step 4*b*, and a semi-circular leaf 4*c* projecting from the raised engaging step 4*b* into the semi-circular notch 4*d*, as shown in FIGS. 4 and 6. In other words, the joints of the eject lever 3 and the rotary arm 4 are symmetrical with respect to each other. The joint is formed by fitting the engaging steps 3*b* and 4*b* to each other in a slidable manner while the semi-circular leaves 3*c* and 4*c* are in opposition to each other, as shown in FIGS. 7 and 8. With this structure, the rotary arm 4 is connected to the eject lever 3 in a rotatable manner without the risk of disconnection. As a result, it becomes possible to pivot the rotary arm 4 in the reverse direction in conjunction with the pivotal movement of the eject lever 3.

The end of the rotary arm 4, in which the claw 4*a* is formed, is shaped into a flange 4*e*, as it is evident from FIG. 9. The position of the flange 4*e* is regulated in a thicknesswise direction thereof by the frame 2 and the pin housing. The cut formed so as to be surrounded by the flange 4*e* forms the claw 4*a*. Similarly, the end of the eject lever 3, in which the claw 3*a* is formed, is shaped into a flange 3*e*. The cut formed so as to be surrounded by the flange 3*e* forms the claw 3*a*.

In the PC card connector having the above described construction, the PC card 1 is moved toward the pin header while being guided by the pair of recessed grooves 2*a* when the PC card 1 is inserted into the frame 2 from its card insert opening. In the meantime, the PC card 1 pushes the claw 3*a* of the eject lever 3 and the claw 4*a* of the rotary arm 4, so that the pin contacts of the pin header are press-fitted into the socket contacts of the PC card 1. As a result of insertion of the PC card 1 into the PC card connector to a predetermined depth, the PC card 1 is reliably connected to the pin contacts, whereby the insertion of the PC card 1 is now completed, as shown in FIG. 1. At this time, the card insertion/withdrawal surface 1*a* of the PC card 1 pushes the eject lever 3 and the rotary lever 4, as a result of which they pivot in opposite directions around the first and second fulcrums 6 and 7, respectively. The push rod 5 moves in a forward direction (i.e., toward the insert opening of the PC card connector) in conjunction with the pivotal movement of the eject lever 3.

If the push rod 5 is pressed while the PC card 1 is inserted in the PC card connector, the eject lever 3 pivots in a clockwise direction in FIG. 1. In conjunction with the pivotal movement of the eject lever 3, the rotary arm 4 also pivots in a counterclockwise direction in FIG. 1. Eventually, the claws 3*a* and 4*a* of the eject lever 3 and the rotary arm 4 push both ends of the card insertion/withdrawal surface la of the PC card 1. In the end, the PC card 1 becomes dislodged from the pin contacts, which permits simple withdrawal of the PC card 1 by the fingers, as shown in FIG. 2.

Therefore, according to the first embodiment, it is possible to push the PC card 1 in a substantially straightforward direction by means of the claws 3*a* and 4*a* of the eject lever 3 and the rotary lever 4 when the inserted PC card 1 is dislodged from the pin contacts. The ejection mechanism of the present embodiment is based on the pivotal movement of the rotary arm 4 utilizing the pivotal movement of the eject lever 3. Compared with the traditional ejection mechanism which converts rotary movement into linear movement, the PC card connector of the present embodiment has the advantage of size reductions, reduced dimensional accuracy, and elimination of the need of a special guide mechanism. For these reasons, the ejection mechanism which permits constantly smooth withdrawal of the PC card 1 is implemented without the need of a complicated or large-sized structure.

The joint between the eject lever 3 and the rotary arm 4 of the present embodiment is formed by fitting the symmetrical engaging steps 3*b* and 4*b* to each other. As is evident from FIG. 8, it is not necessary to increase the thickness of the joint, which is suitable for size reductions. Further, the joint makes it possible to realize reliable connection between the eject lever 3 and the rotary arm 4 without the risk of disengagement. Furthermore, the number of the parts can be reduced because caulking member is not used. The eject lever 3 and the rotary arm 4 may be connected together by use of an ordinary joint such as a burring operation and use of caulking member.

The flanges 3*e* and 4*e* are formed so as to surround the claws 3*a* and 4*a* of the eject lever 3 and the rotary arm 4 in the above embodiment. These flanges 3*e* and 4*e* have such a structure that their positions are regulated in the thicknesswise direction. Therefore, even if the card insertion/withdrawal surface 1*a* of the PC card 1 exerts a strong force on the claws 3*a* and 4*a*, the end of the eject lever 3, in which the claw 3*a* is formed, and the end of the rotary arm 4, in which the claw 4*a* is formed, will not become twisted. As a result, the eject lever 3 and the rotary arm 4 pivot without a hitch and plastic deformation.

Figure 10:
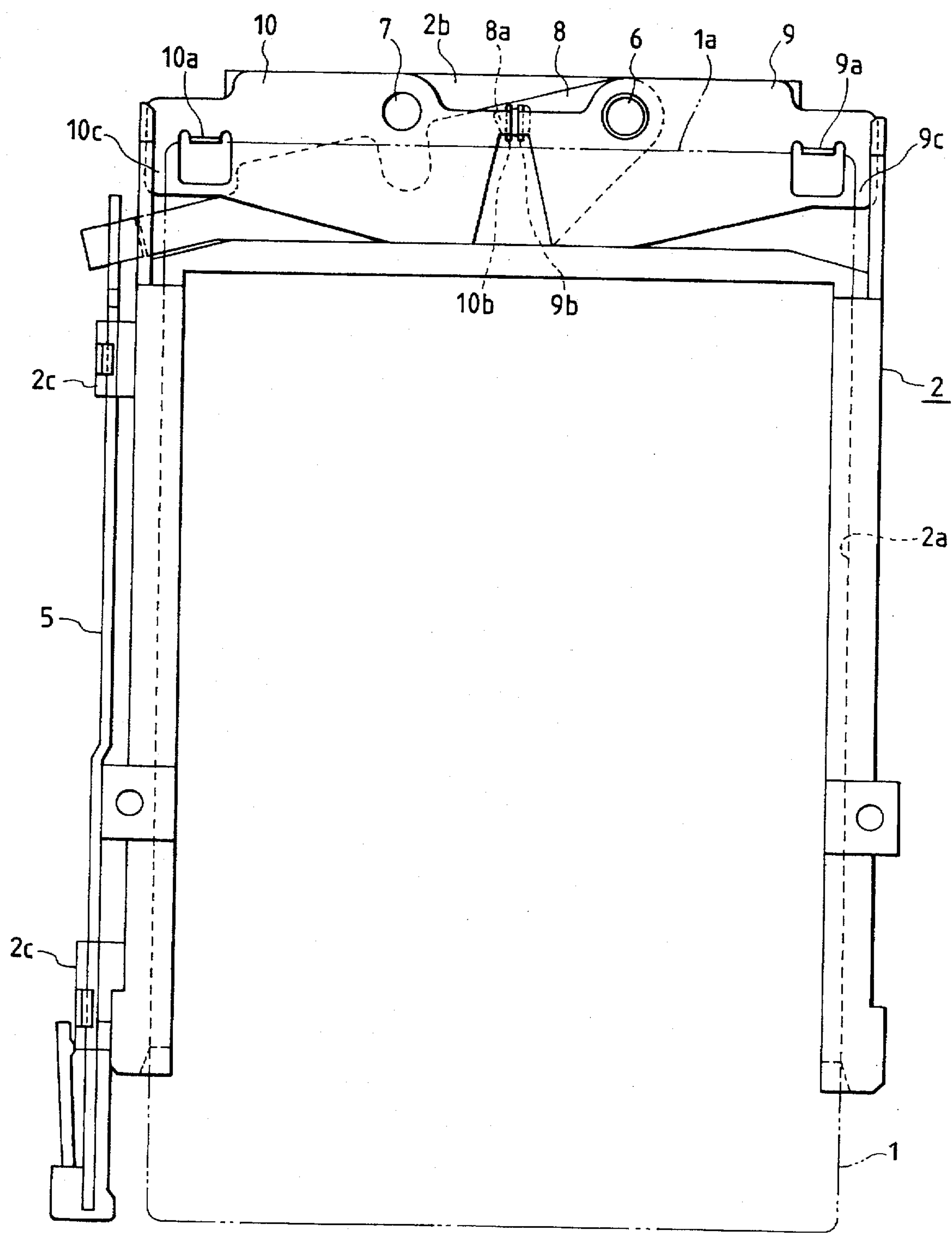
FIG. 10 is a bottom view of a PC card connector according to a second embodiment of the present invention while a PC card is inserted in the PC card connector.
Figure 11:
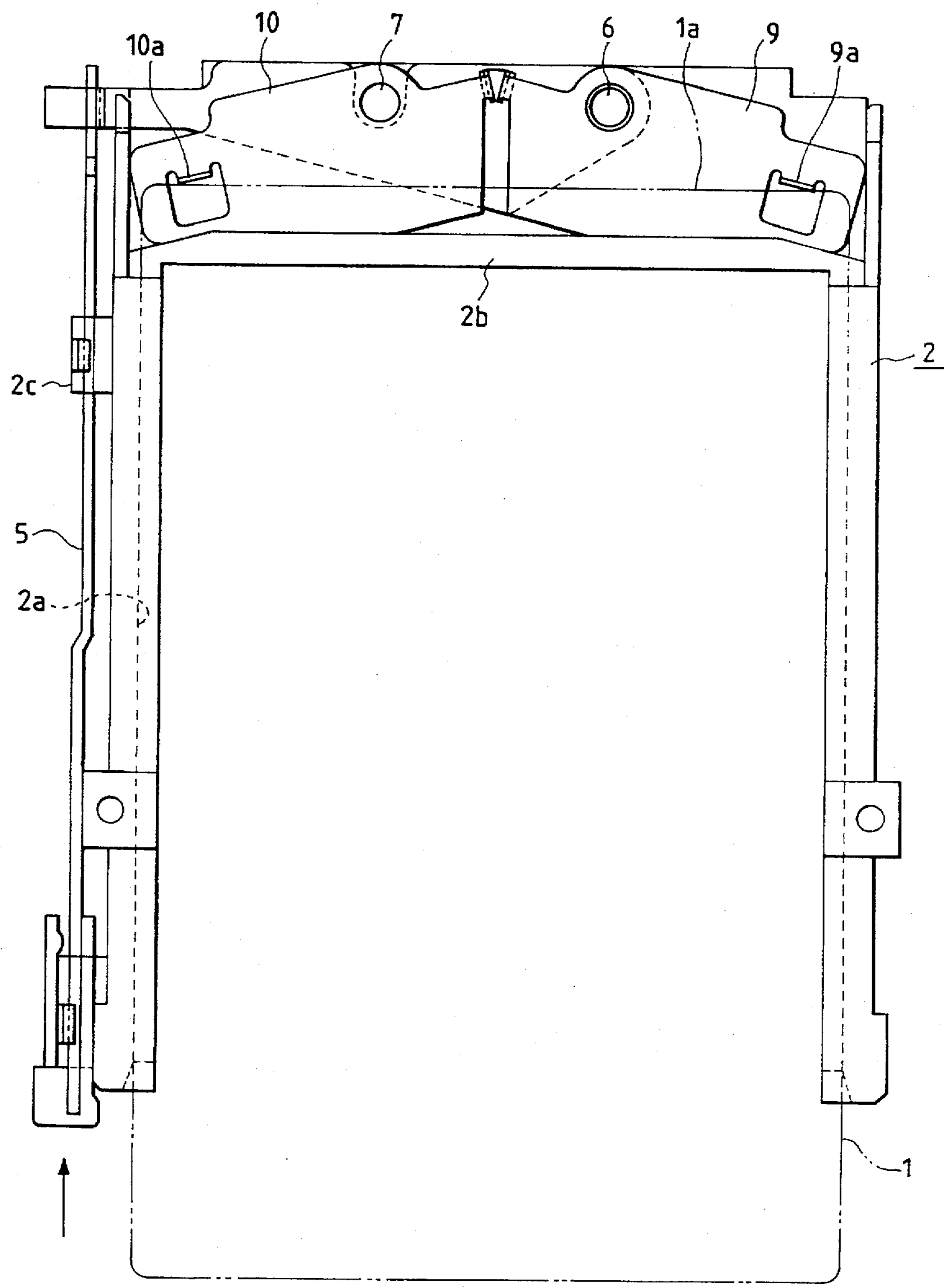
FIG. 11 is a bottom view of the PC card connector, shown in FIG. 10, which is in an ejecting condition immediate after the withdrawal of the PC card.
Figure 12:
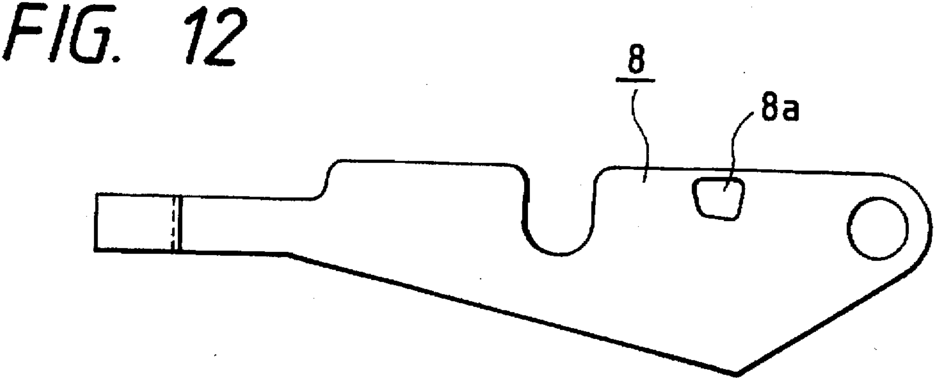
FIG. 12 is a bottom view of an actuating lever used in the second embodiment.
Figure 13:
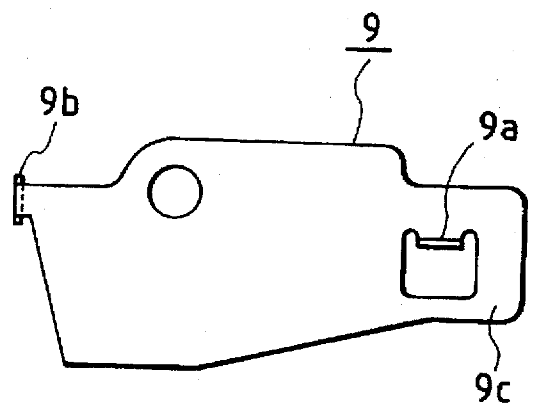
FIG. 13 is a bottom view of a first rotary arm used in the second embodiment.
Figure 14:
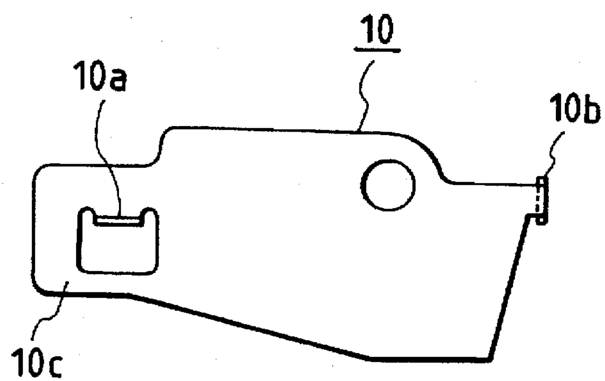
FIG. 14 is a bottom view of a second rotary arm used in the second embodiment.
Figure 15:
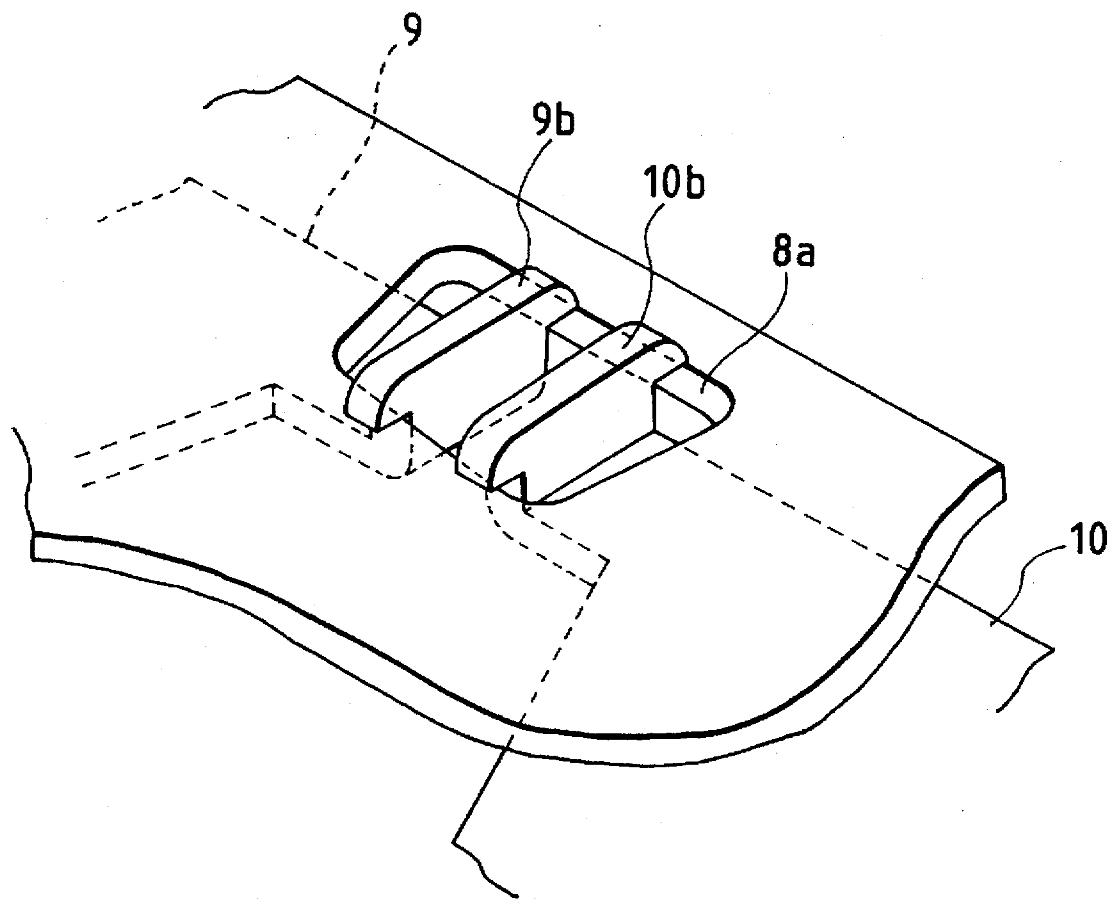
FIG. 15 is a perspective view of the principal elements of the actuating lever and the first and second rotary arms, shown in FIGS. 12 to 14, which shows a joint structure formed between the actuating lever and the first and second rotary arms.

A PC card connector according to a second embodiment of the present invention will now be described with reference to FIGS. 10 through 15. FIG. 10 is a bottom view of a PC card connector according to a second embodiment of the present invention while a PC card is inserted in the PC card connector; FIG. 11 is a bottom view of the PC card connector, shown in FIG. 10, which is in an ejecting condition immediate after the withdrawal of the PC card; FIG. 12 is a bottom view of an actuating lever used in the present embodiment; FIG. 13 is a bottom view of a first rotary arm used in the present embodiment; FIG. 14 is a bottom view of a second rotary arm used in the present embodiment; and FIG. 15 is a perspective view of the principal elements of the actuating lever and the first and second rotary arms, shown in FIGS. 12 to 14, which shows a joint structure formed between the actuating lever and the first and second rotary arms. The same reference numerals as those used in previously described FIGS. 1 and 2 are provided to designate the same elements, and hence their explanations will be omitted here for brevity.

As is evident from FIGS. 10 and 11, the ejection mechanism of the present embodiment comprises the push rod 5 which is pressed to withdraw the PC card 1, an actuating lever 8 which is supported by the first fulcrum 6 in a pivotal manner and has one end engaged with the push rod 5, a first rotary arm 9 which is supported by the first fulcrum 6 in a pivotal manner and has one end close to the push rod 5 connected to the actuating lever 8, and which has a claw 9*a* for ejecting the PC card 1 at the other end, and a second rotary arm 10 which is supported by the second fulcrum 7 in a pivotal manner and has, at one end close to the push rod 5, a claw 10*a* to eject the PC card 1, and which has the other end connected to the actuating lever 8. A joint hole 8*a* to be connected to the first and second rotary arms 9 and 10 is formed at a predetermined location of the actuating lever 8 close to the push rod 5 in relation to the first fulcrum 6 which is the pivotal axis of the actuating lever 8. Further, engaging pieces 9*b* and 10*b* which engage with the joint hole 8*a* are formed at the ends of the rotary arms 9 and 10, respectively.

These engaging pieces 9*b* and 10*b* are engaged with the joint hole 8*a* in such a condition as shown in FIG. 15. As a result, the rotary arms 9 and 10 are jointed to the actuating lever 8 in a pivotal manner without the risk of disconnection. By virtue of such an engagement, it is possible to pivot the first rotary arm 9 in the same direction in which the actuating lever 8 pivots and the second rotary arm 10 in the reverse direction, in conjunction with the pivotal movement of the actuating lever 8.

As described above, according to the present embodiment, if the push rod 5 is pressed while the PC card 1 is inserted in the PC card connector, as shown in FIG. 10, the first and second rotary arms 9 and 10 pivot in opposite directions in conjunction with the pivotal movement of the actuating lever 8, whereby they change to such a condition as shown in FIG. 11. As a result, the claws 9*a* and 10*a* of the rotary arms 9 and 10 push both ends of the card insertion/withdrawal surface 1*a* of the PC card 1. In short, the PC card 1 is pushed in a substantially straightforward direction in which the PC card 1 is withdrawn. Therefore, constantly smooth withdrawal of the PC card 1 is assured. The ejection mechanism of the present embodiment is based on the pivotal movement of the first and second rotary arms 9 and 10 utilizing the pivotal movement of the actuating lever 8. Hence, the ejection mechanism of the present embodiment neither require exacting dimensional accuracy nor obstruct size reduction.

As in the previous embodiment, the end of the first rotary arm 9, in which the claw 9*a* is formed, and the end of the second rotary arm 10, in which the claw 10*a* is formed, are shaped into flanges 9*c* and 10*c*, respectively, in the present embodiment. The positions of these flanges 9*c* and 10*c* are regulated in the thicknesswise direction thereof. Cuts formed so as to be surrounded by the flanges 9*c* and 10*c* are formed into the claws 9*a* and 10*a*, respectively. Therefore, even if the card insertion/withdrawal surface 1*a* of the PC card 1 exerts a strong force on the claws 9*a* and 10*a*, the end of the first rotary arm 9, in which the claw 9*a* is formed, and the end of the second rotary arm 10, in which the claw 10*a* is formed, will not become twisted. As a result, the first rotary arm 9 and the second rotary arm 10 pivot without a hitch and plastic deformation.

As has been described above, the injection mechanism of the PC card connector of the present invention is designed in such a way that two member having claws at ends pivot and the claws move forwardly if the push rod is pressed while the PC card is inserted in the PC. The claws of these two members make it possible to push the PC card in a substantially straightforward direction in which the PC card is withdrawn. Compared with the traditional ejection mechanism which converts rotary movement into linear movement, the PC card connector of the present invention has the advantage of size reductions, reduced dimensional accuracy, and elimination of the need of a special guide mechanism. For these reasons, the ejection mechanism which permits constantly smooth withdrawal of the PC card 1 is implemented without the need of a complicated or large-sized structure, which considerably contributes to improved reliability of the PC card connector and reduced cost.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. A PC card connector having a plurality of pin contacts for insertion and withdrawal of a PC card thereon, the PC card connector comprising:

a push rod for controlling the withdrawal of the PC card;

an eject lever which is pivotally supported by a first fulcrum, the eject lever including a first end engaged with the push rod and a first claw at a second end of the eject lever for ejecting the PC card; and a rotary arm which is pivotally supported by a second fulcrum, the rotary arm including a first end having a second claw to eject the PC card, and a second end connected to the eject lever at a predetermined location, wherein the predetermined location of the eject lever is defined on an opposite side of the first claw with respect to the first fulcrum such that the first fulcrum is located between the predetermined location and the first claw.

2. The PC card connector as defined in claim 1, wherein at least one of the second end of the eject lever and the first end of the rotary arm is formed into a flange which is subjected to positional regulation in a thicknesswise direction, and a cut formed so as to be surrounded by the flange forms the claw of that member.

3. The PC card connector as defined in claim 1, wherein the second claw is formed in on the rotary arm adjacent to the push rod.

4. The PC card connector as defined in claim 3, wherein an engaging step having a leaf which projects into a notch is formed in respective joints of the eject lever and the rotary arm, and the engaging steps of the eject lever and the rotary arm are fitted to each other in a slidable manner while the leaves are opposite to each other.

5. The PC card connector as defined in claim 3, wherein at least one of the second end of the eject lever and the first end of the rotary arm is formed into a flange which is subjected to positional regulation in a thicknesswise direction, and a cut formed so as to be surrounded by the flange forms the claw of that member.

6. The PC card connector as defined in claim 1, wherein an engaging step having a leaf which projects into a notch is formed in respective joints of the eject lever and the rotary arm, and the engaging steps of the eject lever and the rotary arm are fitted to each other in a slidable manner while the leaves are opposite to each other.

7. The PC card connector as defined in claim 6, wherein at least one of the second end of the eject lever and the first end of the rotary arm is formed into a flange which is subjected to positional regulation in a thicknesswise direction, and a cut formed so as to be surrounded by the flange forms the claw of that member.

8. A PC card connector having a plurality of pin contacts for insertion and withdrawal of a PC card thereon, the PC card connector comprising:

a push rod for controlling the withdrawal of the PC card;

an actuating lever which is pivotally supported by a first fulcrum, the actuating lever including a first end engaged with the push rod;

a first rotary arm which is pivotally supported by the first fulcrum, the first rotary arm including a first end having a first claw to eject the PC card, and second end connected to the actuating lever at a predetermined location; and a second rotary arm which is pivotally supported by a second fulcrum, the second rotary arm including a first end having a second claw to eject the PC card, and a second end connected to the actuating lever at the predetermined location, wherein the predetermined location of the actuating lever is defined such that the predetermined location is located between the first end of the actuating member and the first fulcrum.

9. The PC card connector as defined in claim 8, wherein at least one of the first end of the first rotary arm and the first end of the second rotary arm is formed into a flange which is subjected to positional regulation in a thicknesswise direction, and a cut formed so as to be surrounded by the flange forms the claw of that member.

10. The PC card connector as defined in claim 8, wherein the second claw is formed in on the second rotary arm adjacent to the push rod.

11. The PC card connector as defined in claim 10, wherein a joint hole is formed in the predetermined location of the actuating lever, and engaging strips which engage with the joint hole are formed at the first ends of the first and second rotary arms, respectively.

12. The PC card connector as defined in claim 10, wherein at least one of the first end of the first rotary arm and the first end of the second rotary arm is formed into a flange which is subjected to positional regulation in a thicknesswise direction, and a cut formed so as to be surrounded by the flange forms the claw of that member.

13. The PC card connector as defined in claim 8, wherein a joint hole is formed in the predetermined location in the actuating lever, and engaging strips which engage with the joint hole are formed at the first ends of the first and second rotary arms, respectively.

14. The PC card connector as defined in claim 13, wherein at least one of the first end of the first rotary arm and the first end of the second rotary arm is formed into a flange which is subjected to positional regulation in a thicknesswise direction, and a cut formed so as to be surrounded by the flange forms the claw of that member.

* * * * *